Patented June 23, 1942

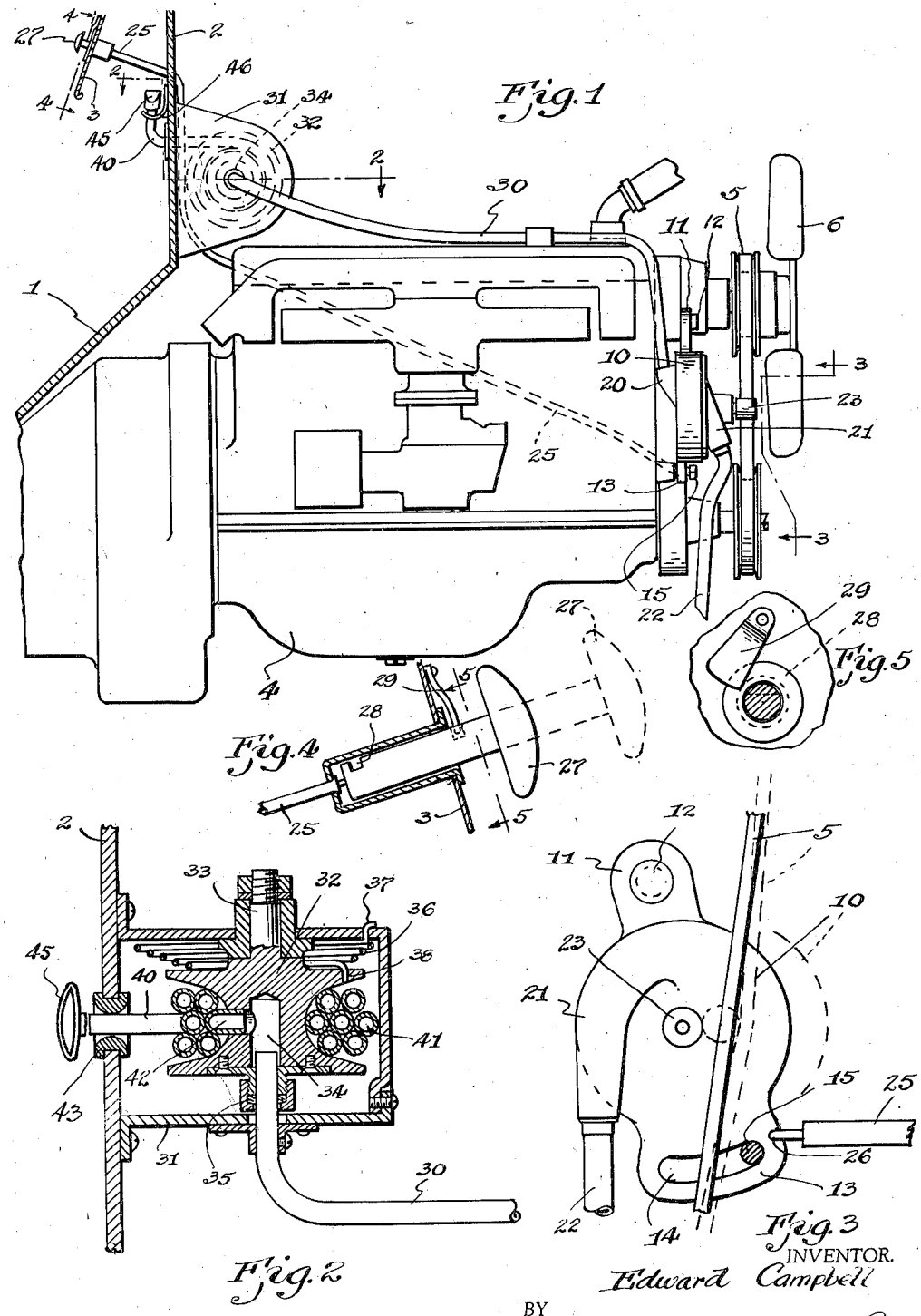

2,287,602

UNITED STATES PATENT OFFICE 2,287,602

VACUUM SWEEPER FOR AUTOMOBILES

Edward Campbell, Detroit, Mich.

Application March 26, 1941, Serial No. 385,385

1 Claim. (Cl. 15—15)

This invention relates to a sweeper for automobiles, and it has to do more particularly with a vacuum sweeper or cleaner particularly for use in cleaning the interior of the body.

The aim of the invention primarily is to provide an arrangement which can be installed on an automobile as more or less permanent equipment, and wherein the vacuum motor or fan is arranged to be operated from the engine or from a moving part of the vehicle while the nozzle and the hose of the vacuum sweeper are normally stored in a compact clean condition, remaining coupled to the vacuum motor for immediate use, but wherein the nozzle and hose can be quickly and easily withdrawn from its compact storage arrangement and manipulated throughout the interior of the automobile.

The invention will be more clearly understood and appreciated by a consideration of the following detailed description in conjunction with the accompanying drawing.

Fig. 1 is a general view illustrating the engine of an automobile in side elevation and showing the sweeper of the present invention associated therewith.

Fig. 2 is an enlarged cross sectional view taken substantially on line 2—2 of Fig. 1.

Fig. 3 is an elevational view taken substantially on line 3—3 of Fig. 1 showing the vacuum motor or fan.

Fig. 4 is a detailed sectional view taken substantially on line 4—4 of Fig. 1.

Fig. 5 is an enlarged cross sectional view showing one form of controlling means.

As shown in Fig. 1, the floor boards of an automotive vehicle are illustrated at 1, the dash at 2, and the instrument panel at 3. The usual engine is generally illustrated at 4. The particular engine shown is provided with a belt 5 which may be employed to operate the usual fan 6, the belt running over pulleys as shown.

The vacuum motor or fan is disposed in a suitable housing 10 movably mounted on a fixed support. As shown in Fig. 3 the housing 10 has an extension 11 pivotally mounted upon the engine as at 12. For stabilizing the housing it may have a slidable connection with the engine, for which purpose the housing may have a member 13 slotted as at 14 on an arc around the point 12 for receiving a stabilizing stud 15. The motor or fan may be of the conventional centrifugal type and the housing 10 may have an inlet 20 disposed substantially on the axis of the fan and an outlet 21 to which an outlet pipe 22 may be connected, and which may extend downwardly to a point adjacent the lower portion of the engine.

For the purpose of driving the fan, the same is provided with a pulley 23 positioned in proximity to the engine belt 5 and which may be placed into or out of engagement with the belt as indicated in Fig. 3 by shifting the housing 10. Suitable means for shifting the housing is provided, and this means is preferably controlled from the interior of the vehicle. One form of means is that of a Bowden wire 25 connected to the fan housing as at 26 and extending to an accessible location such, for example, as the instrument panel 3. The Bowden wire is provided with a suitable knob or operating means 27. It will be noted that if the knob 27 is pulled by an operator, the housing 10 is swung counter-clockwise around the pivotal connection 12 as Fig. 3 is viewed, and the pulley 23 is moved into engagement with the belt 5, and the fan is thereupon driven by the engine of the vehicle. This position is shown by the dotted lines in Fig. 3. When the knob of the Bowden wire is pushed inwardly, the fan is shifted clockwise as Fig. 3 is viewed, or to the full line position so that the pulley 23 is clear of the belt 5. The stem of the knob is provided with a notch 28, and a pivoted latch 29 is arranged to catch in the notch to hold the pulley 23 against the belt 5.

The inlet 20 for the vacuum motor is connected through the means of suitable conduits to a nozzle which can be manipulated over surfaces and objects to be cleaned, and the arrangement is such that some portion of the conduit is stationary, while another portion is movable or extendable so that the same can be stored or maintained in a compact clean condition but extended for use. To this end a suitable conduit or tube 30 connects to the inlet 20 and this may be a metal tube permanently positioned. Mounted on the dash 2 is a casing 31 in which a reel or spool 32 is journaled as at 33. The pipe 30 enters a hollow part 34 of the reel on its axis and a packing joint 35 may be employed to maintain a reasonably tight connection. A spring in the nature of a spiral spring 36 has one end as at 37 secured to the housing and its other end as at 38 secured to the reel, and this spring serves to normally hold the spool in one position but permits the spool to be turned.

A flexible hose or tube 40 is designed to be wound upon the spool, the several windings being illustrated at 41, and one end thereof, as at 42, is fastened in an opening in the spool which communicates with the bore 34. This tube extends through the dash 2 through an opening which may be defined by a grommet 43, and its opposite end is equipped with a suitable nozzle 45. The nozzle may be placed upon a hook or other suitable holding means 46.

When the apparatus is out of use for normal operation of the vehicle, the parts are in a position substantially as shown in Fig. 1. The spring 36 has caused the spool to revolve to wind the flexible hose upon the spool, while the pulley 23 is out of engagement with the belt 5. At this time the flexible hose is compactly stored upon the spool and kept clean by the casing 31 and the nozzle is held up out of the way. Any time it is desired to clean the interior of the vehicle, the nozzle is grasped and may be pulled to unwind the flexible hose from the reel. This rotates the reel and places a tension upon the spring 36. The length of the flexible hose is preferably such that the nozzle may reach all portions of the floor and interior trim and upholstery in the interior of the vehicle. The knob 27 of the Bowden wire may now be pulled outwardly to swing the fan housing and cause the pulley 23 to engage the engine belt 5. The nozzle may be manipulated over the vehicle, and the spring 36 and reel 32 may serve to keep the flexible hose in a taut condition so that there is no excess hose in the way of the operator. In other words, the effective length of the flexible hose automatically shortens and lengthens itself as desired.

Thus it will be observed that a simple compact structure normally entirely out of the way but easily accessible for use may be permanently mounted upon a vehicle and driven by the vehicle engine at the option of the user. The dirt and dust drawn into the nozzle are discharged on to the ground and no receptacle is necessary. It is, of course, obvious that any suitable movable part of the engine may be employed for rotating the fan. The belt, however, is exposed and is therefore a convenient driving member.

I claim:

A vacuum sweeper for an automotive vehicle having an engine compartment and a passenger compartment separated by a partition, a suction fan including a housing having an inlet and an outlet, means for mounting the suction fan in the engine compartment, the suction fan having an operating member, control means operable to shift the operating member into and out of cooperative relationship with an element driven by the engine for controlling the operation of the suction fan, a casing mounted on said partition in the engine compartment, the partition having an aperture therein which opens into the passenger compartment and the casing, a reel journaled in the casing on an axis substantially paralleling the partition, the reel having a hollow interior which opens on its axis, a conduit extending from the inlet of the housing through the casing on the axis of the reel and into the hollow of the reel, a flexible conduit adapted to be wound upon the reel and having one end connected with the hollow interior of the reel, said flexible conduit extending through the aperture in the partition and into the passenger compartment and arranged to have a nozzle attached thereto, said aperture snugly fitting the flexible conduit substantially throughout its circumferential extent, the reel having a single groove formation relatively large as compared to the diameter of the flexible conduit whereby a plurality of convolutions of the flexible conduit are superimposed upon each other when the flexible conduit is wound upon the reel so that all convolutions are in approximate alignment with the aperture in the partition, and spring means acting on the reel to normally wind the flexible conduit thereon and arranged to flex for the withdrawing of the flexible conduit from the reel into the passenger compartment for use.

EDWARD CAMPBELL.